(12) United States Patent
Griggs

(10) Patent No.: US 10,288,217 B2
(45) Date of Patent: May 14, 2019

(54) ACCESSORY MOUNT FOR PORTABLE ELECTRONIC DEVICES

(71) Applicant: Stephen D. Griggs, Winston-Salem, NC (US)

(72) Inventor: Stephen D. Griggs, Winston-Salem, NC (US)

(*) Notice: Subject to any disclaimer, the term of this patent is extended or adjusted under 35 U.S.C. 154(b) by 0 days.

(21) Appl. No.: 14/958,131

(22) Filed: Dec. 3, 2015

(65) Prior Publication Data

US 2016/0161052 A1 Jun. 9, 2016

Related U.S. Application Data

(60) Provisional application No. 62/087,522, filed on Dec. 4, 2014.

(51) Int. Cl.

| | |
|---|---|
| *H02J 7/00* | (2006.01) |
| *F16M 13/02* | (2006.01) |
| *F16B 1/00* | (2006.01) |
| *H01F 38/14* | (2006.01) |
| *F16M 11/24* | (2006.01) |
| *F16M 13/00* | (2006.01) |
| *H04B 1/3877* | (2015.01) |
| *H04M 1/04* | (2006.01) |
| *B60R 11/02* | (2006.01) |
| *H02J 7/02* | (2016.01) |
| *B60R 11/00* | (2006.01) |
| *H02J 50/10* | (2016.01) |

(52) U.S. Cl.
CPC ............. *F16M 13/02* (2013.01); *B60R 11/02* (2013.01); *F16B 1/00* (2013.01); *F16M 11/24* (2013.01); *F16M 13/00* (2013.01); *F16M 13/022* (2013.01); *H01F 38/14* (2013.01); *H02J 7/0044* (2013.01); *H04B 1/3877* (2013.01); *H04M 1/04* (2013.01); *B60R 2011/0008* (2013.01); *B60R 2011/0015* (2013.01); *B60R 2011/0035* (2013.01); *F16B 2001/0035* (2013.01); *H02J 7/0042* (2013.01); *H02J 7/025* (2013.01); *H02J 50/10* (2016.02)

(58) Field of Classification Search
CPC .............................. F16M 13/02; H02J 7/0044
USPC .......................................................... 320/108
See application file for complete search history.

(56) References Cited

U.S. PATENT DOCUMENTS

| | | | |
|---|---|---|---|
| 3,964,612 A | 6/1976 | Skilliter, Jr. et al. | |
| 4,652,982 A * | 3/1987 | Flowerday ............. | B60J 3/0282 296/97.5 |
| 4,681,366 A * | 7/1987 | Lobanoff ............. | B60N 2/4876 248/475.1 |

(Continued)

OTHER PUBLICATIONS

Copenheaver, Blaine R., International Search Report for PCT/US2015/063679, dated Feb. 4, 2016, Alexandria, Virginia.

*Primary Examiner* — Suchin Parihar
(74) *Attorney, Agent, or Firm* — Trego, Hines & Ladenheim, PLLC

(57) ABSTRACT

An accessory mount for a portable electronic device includes: a main body including first and second legs which meet at mutual proximate ends thereof so as to form an L-shape; a first flange disposed at a distal end of the first leg that extends away from the first leg in a direction opposite to the second leg; and a second flange disposed at a distal end of the second leg that extends away from the second leg in a direction opposite to the first leg.

8 Claims, 14 Drawing Sheets

(56) References Cited

U.S. PATENT DOCUMENTS

| | | | |
|---|---|---|---|
| 2005/0200696 A1* | 9/2005 | Schedivy | B60R 11/0235 |
| | | | 348/61 |
| 2008/0232044 A1* | 9/2008 | Moscovitch | F16M 11/041 |
| | | | 361/679.04 |
| 2008/0235908 A1* | 10/2008 | Chen | G06F 1/1616 |
| | | | 16/367 |
| 2009/0201661 A1* | 8/2009 | Kim | F16M 11/14 |
| | | | 361/829 |
| 2010/0252696 A1 | 8/2010 | Sage | |
| 2011/0129210 A1 | 6/2011 | McGucken | |
| 2012/0199621 A1 | 8/2012 | Yoon | |
| 2012/0202427 A1 | 8/2012 | Gioscia et al. | |
| 2013/0078855 A1* | 3/2013 | Hornick | H01R 13/73 |
| | | | 439/571 |
| 2013/0168288 A1 | 7/2013 | Liang et al. | |
| 2015/0122858 A1* | 5/2015 | Azadi | B60R 11/04 |
| | | | 224/483 |
| 2015/0172517 A1* | 6/2015 | Chen | H04N 5/2251 |
| | | | 348/376 |
| 2015/0288409 A1* | 10/2015 | Forsythe | H04B 1/3888 |
| | | | 455/575.6 |
| 2015/0343957 A1* | 12/2015 | Narayanan | B60R 11/02 |
| | | | 224/275 |
| 2016/0215926 A1* | 7/2016 | Pollex | F16M 11/041 |
| 2017/0013950 A1* | 1/2017 | Rieger | F16M 13/00 |
| 2017/0339800 A1* | 11/2017 | Burns | F16M 11/10 |

* cited by examiner

ACCESSORY MOUNT FOR PORTABLE ELECTRONIC DEVICES

BACKGROUND OF THE INVENTION

This invention relates generally to accessories for portable electronic devices and more particularly to a mounting apparatus for portable electronic devices.

Numerous types of portable electronic devices are available on the market, such as telephones, tablet computers, portable global positioning system ("GPS") navigators, electronic book readers, digital music players, cassette and compact disk (CD) players, calculators, and the like. Many of these portable electronic devices are similar in that they have a slab-like form, with a generally rectangular shape in plan view and a thickness which is small compared to the lateral dimensions of the rectangular shape. For example, so-called "smart phones" and tablet computers (or simply "tablets") often include a flat front screen on a thin slab-like body.

It is often desirable to support or mount such portable electronic devices in a fixed position to facilitate their use for specific purposes. For example, they may be placed on a desk or table, or mounted in a vehicle in the operator's field of view. Numerous accessory mounts are known for portable electronic devices, but often lack flexibility for use with multiple devices, or can be bulky and inconvenient.

Accordingly, there remains a need for an improved accessory mount accommodating various portable electronic devices.

BRIEF SUMMARY OF THE INVENTION

This need is addressed by a modular accessory mount which can be assembled in numerous configurations for use with portable electronic devices.

According to one aspect of the technology described herein, an accessory mount for a portable electronic device includes: a main body including first and second legs which meet at mutual proximate ends thereof so as to form an L-shape; a first flange disposed at a distal end of the first leg that extends away from the first leg in a direction opposite to the second leg; and a second flange disposed at a distal end of the second leg that extends away from the second leg in a direction opposite to the first leg.

According to another aspect of the technology described herein, an accessory mount for a portable electronic device includes: a main body including first and second legs which meet at mutual proximate ends thereof so as to form an L-shape, wherein the second leg defines a front face comprising means for connecting a portable electronic device thereto; and an extension; wherein the main body and the extension are configured to be connected to each other in a plurality of different configurations.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
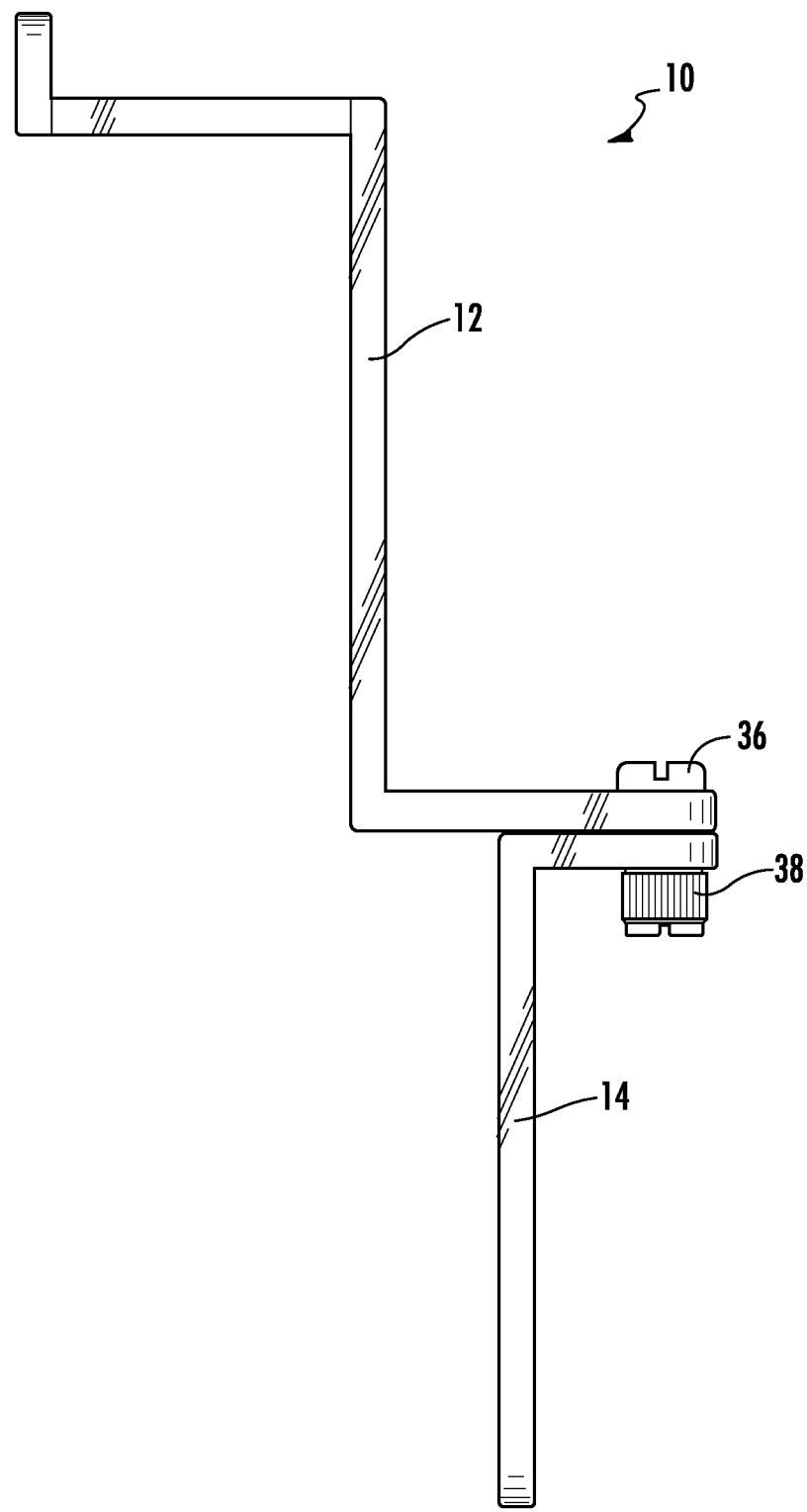
FIG. 1 is a schematic side view of an accessory mount.
Figure 2:
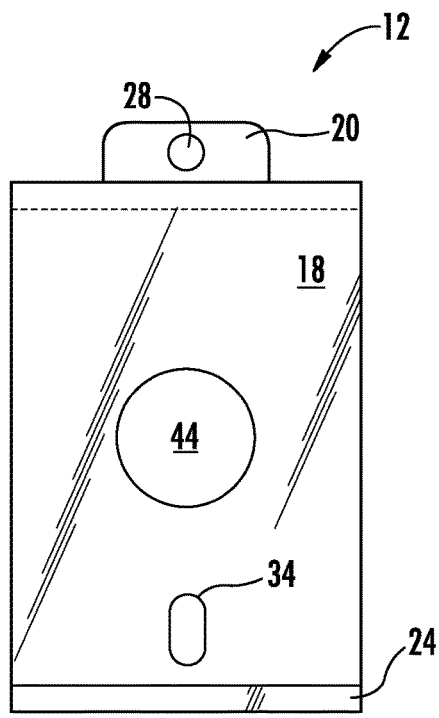
FIG. 2 is a front elevation view of a main body of an accessory mount.
Figure 3:
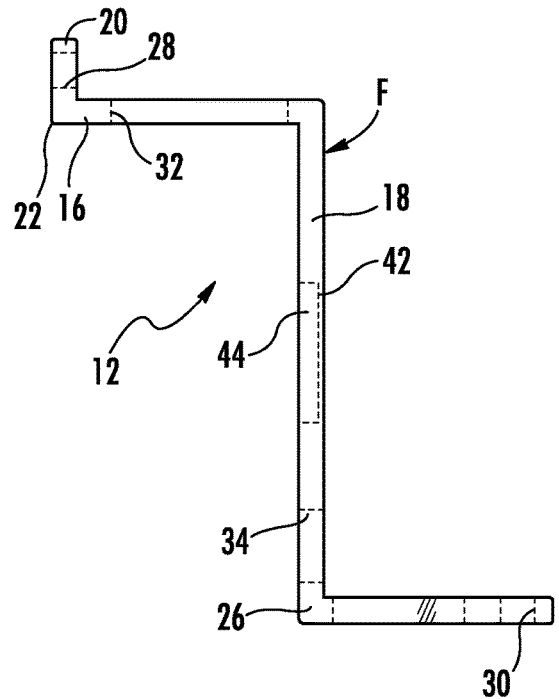
FIG. 3. is a side elevation view of the main body of FIG. 2.

Referring to the drawings wherein identical reference numerals denote the same elements throughout the various views, FIG. 1 illustrates an exemplary accessory mount 10. The basic components of the accessory mount 10 are a main body 12 and an extension 14. As will be explained in more detail below, the main body 12 and the extension 14 can be assembled together in a number of different configurations.

Referring to FIGS. 1 and 2-4, the main body 12 takes the form of a plate which may have a constant width and/or a constant thickness incorporating several bends of an appropriate angle, for example 90-degree bends, that define several subcomponents of the main body 12. These subcomponents include a first leg 16 which meets a second leg 18 to form an L-shape at mutual proximate ends thereof, a first flange 20 disposed at a distal end 22 of the first leg 16 and extending away from the first leg 16 opposite from the second leg 18, and a second flange 24 disposed at a distal end 26 of the second leg 18 and extending away from the second leg 18 in a direction opposite to the first leg 16.

Figure 6:
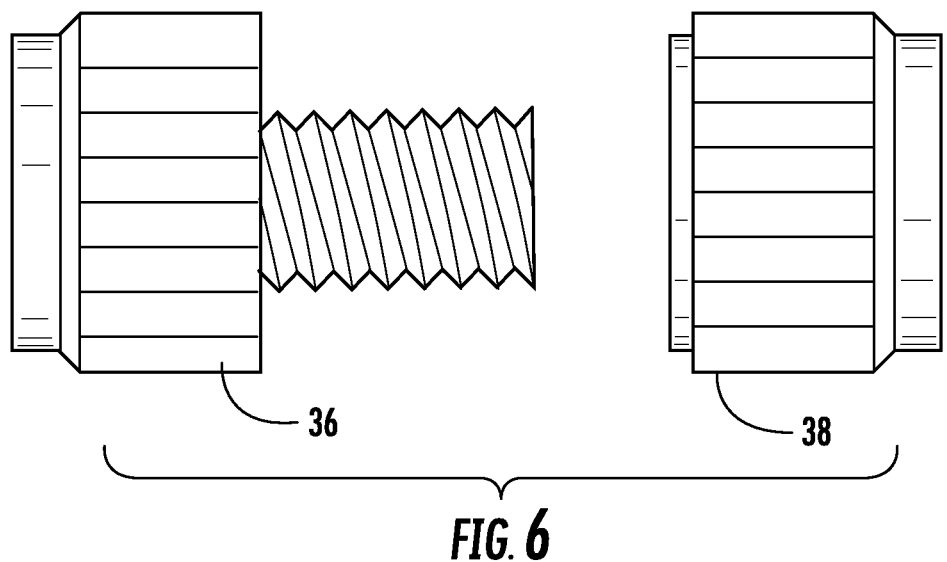
FIG. 6 is a side view of a connecting screw and thumb nut.

The main body 12 can include several holes, slots, or other openings to facilitate assembly and/or mounting. Collectively these may be referred to as "assembly openings". In the illustrated example, a first hole 28 is formed in the first flange 20, and a second hole 30 is formed in the second flange 24. A first slot 32 is formed in the first leg 16, and a second slot 34 is formed in the second leg 18. Each of these holes and slots may be sized to accept a mechanical fastener such as the screw 36 and thumb nut 38 shown in FIG. 6. It is noted that the specific type of mechanical fastener is not critical. For example the screw 36 and thumb nut 38 may be configured to be operated without tools as shown in FIG. 6; alternatively one or both fastener components may be configured with a slot, groove, or recess adapted to be engaged by a tool as shown in FIG. 1. A third hole 40 is formed in the second flange 24. This is larger in diameter than the other holes and slots and may be used to provide clearance for wires and cables. In the illustrated example, the third hole 40 has a diameter of approximately 2.86 cm (1.125 in.). As will be described later, this particular diameter is useful in mounting the main body 12 to various objects.

Figure 5:
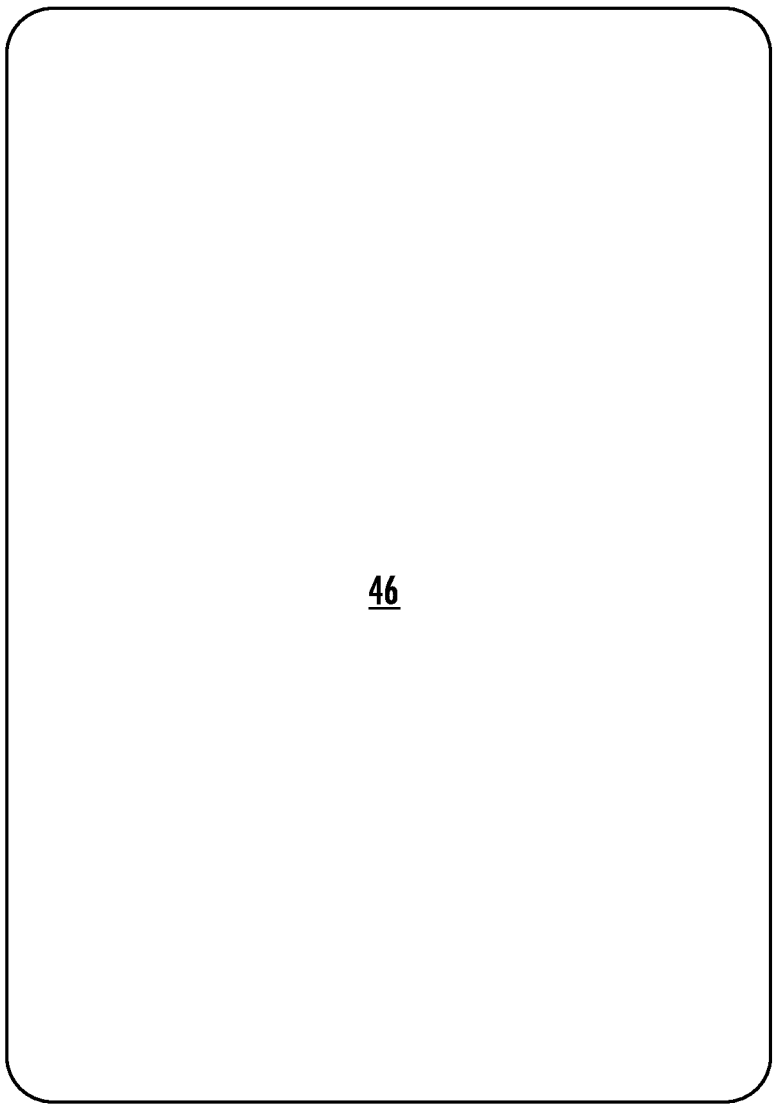
FIG. 5 is a plan view of a mounting plate for use with the accessory mount of FIG. 1.
Figure 7:
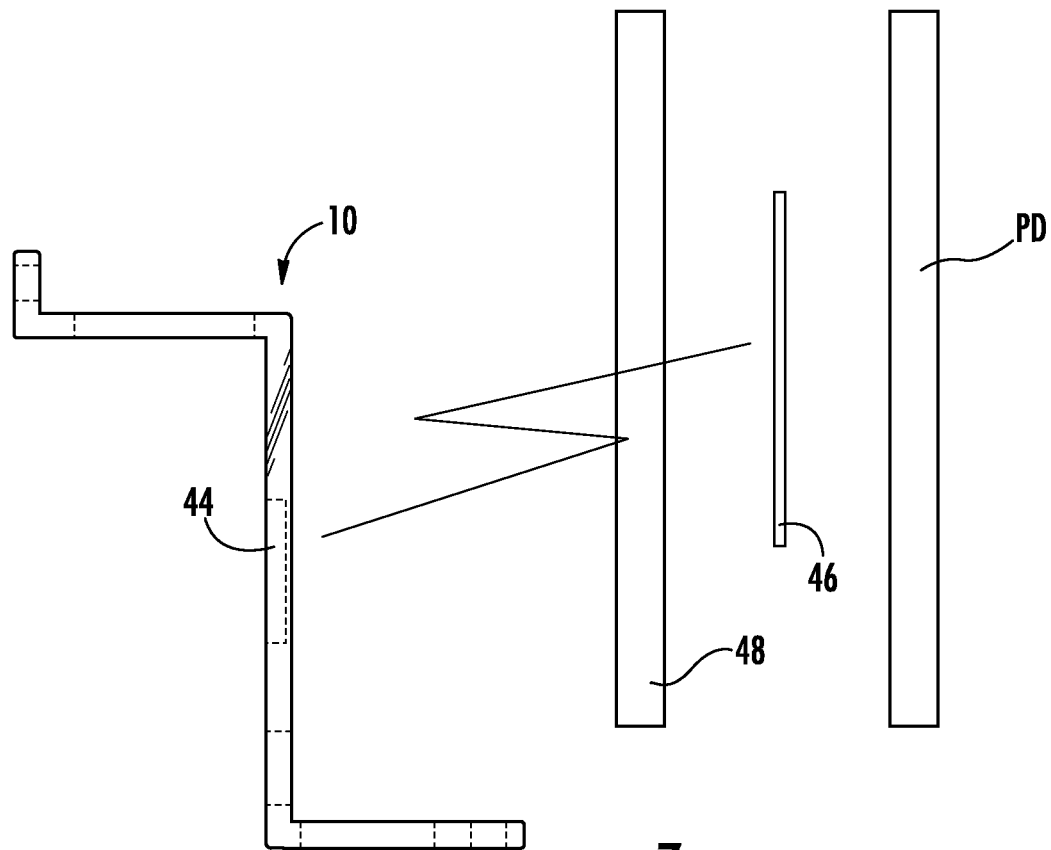
FIG. 7 is a schematic exploded view of the mounting plate of FIG. 5 along with a portable electronic device.
Figures 8, 9:
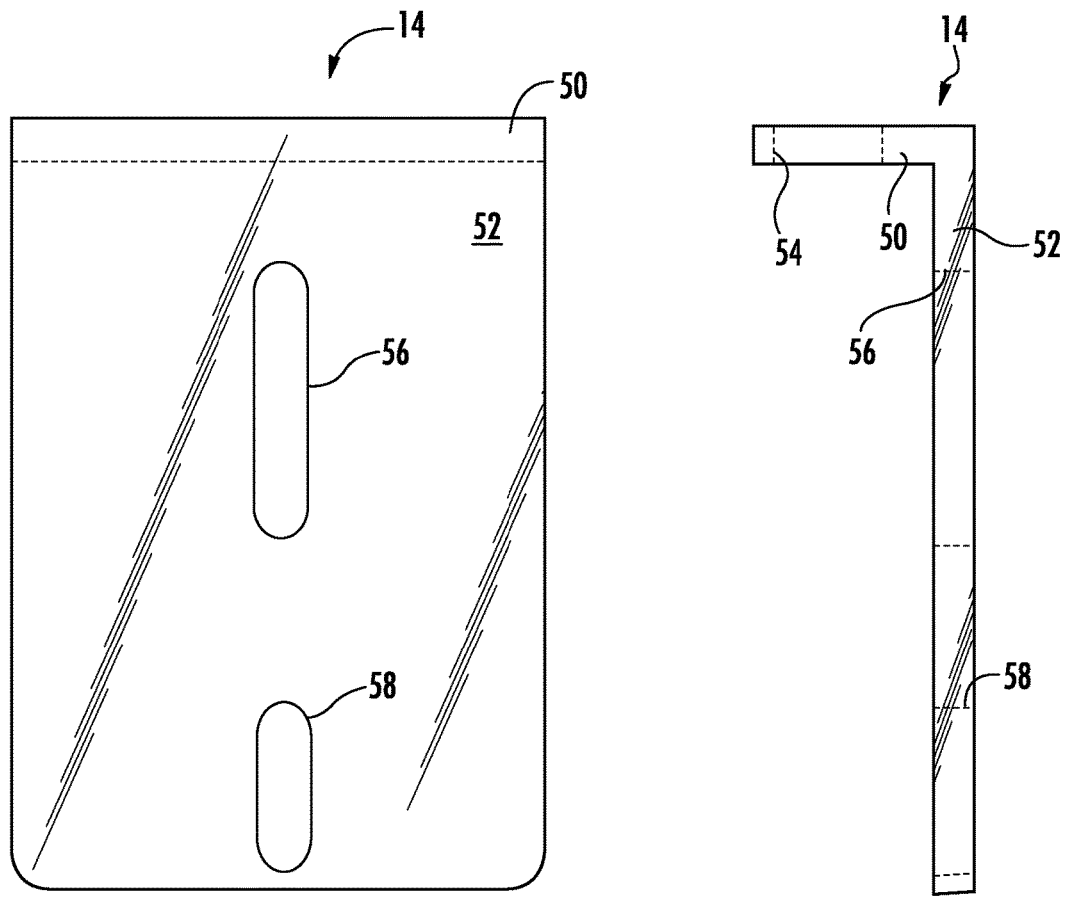
FIG. 8 is a front elevation view of an extension of an accessory mount.
FIG. 9. is a side elevation view of the extension of FIG. 8.

The second leg 18 defines a front face "F" and incorporates means for connecting a portable electronic device to the front face F. In the illustrated example, a recess 42 is formed in the second leg 18 and a magnet 44 is disposed in the recess 42. It may be retained in place by suitable means such as adhesives, encapsulating within injection-molded material, or an interference fit. The magnet 44 serves to form a magnetic connection with any portable electronic device containing a sufficient amount of ferromagnetic material. Optionally, a thin ferromagnetic mounting plate 46 (e.g. steel), seen in FIG. 5, may be placed between a portable electronic device "PD", shown in FIG. 7 and a conventional protective case 48, or retained in place by suitable means such as adhesives applied directly to the portable electronic device "PD". The mounting plate 46 provides material for the magnet 44 to attract.

The magnet 44 is particularly useful for providing a simple connection which is convenient to make and break. However, any means effective to connect the portable electronic device PD to the second leg 18 may be substituted for the magnet 44. Non-limiting examples of connection means include mechanical clips or clamps, mechanical fasteners, adhesives, or materials such as hook-and-loop fasteners.

Referring to FIGS. 1 and 8-10, the extension 14 takes the form of a plate which may have a constant width and/or a constant thickness incorporating a single bend of an appropriate angle, for example a 90-degree bend, that defines a first extension leg 50 which meets a second extension leg 52 to form an L-shape at mutual proximate ends thereof.

The extension 14 can include several holes, slots, or other openings to facilitate assembly and/or mounting. Collectively these may be referred to as "assembly openings". In the illustrated example, a first extension slot 54 is formed in the first extension leg 50, and spaced-apart second and third extension slots 56, 58 are formed in the second extension leg 52. Each of these slots may be sized to accept a mechanical fastener such as the screw 36 and thumb nut 38 shown in FIG. 6.

Both the main body 12 and the extension 14 may be formed using any material that is substantially rigid and which will resist anticipated mechanical loads in use. Non-limiting examples of suitable materials include metal alloys, polymers, and fibrous materials (e.g. wood, fiberboard, or paper). One specific example of a suitable material is acrylic sheet material, commercially available as PLEXIGLAS. Another specific example of a suitable material is polycarbonate, commercially available as LEXAN. As an example, the main body 12 and/or the extension 14 may be formed from a flat blank of material which has the appropriate holes, slots, and other openings formed therein and is then bent to form the 90-degree corners described above. Alternatively, the main body 12 and extension 14 could be formed by molding, or by machining from a blank, or by being built up from smaller components which are attached together, or by additive manufacturing methods.

FIGS. 11-21 illustrate several configurations of how the accessory mount 10 may be assembled and used to support a portable electronic device PD connected to the front face F.

Figure 11:
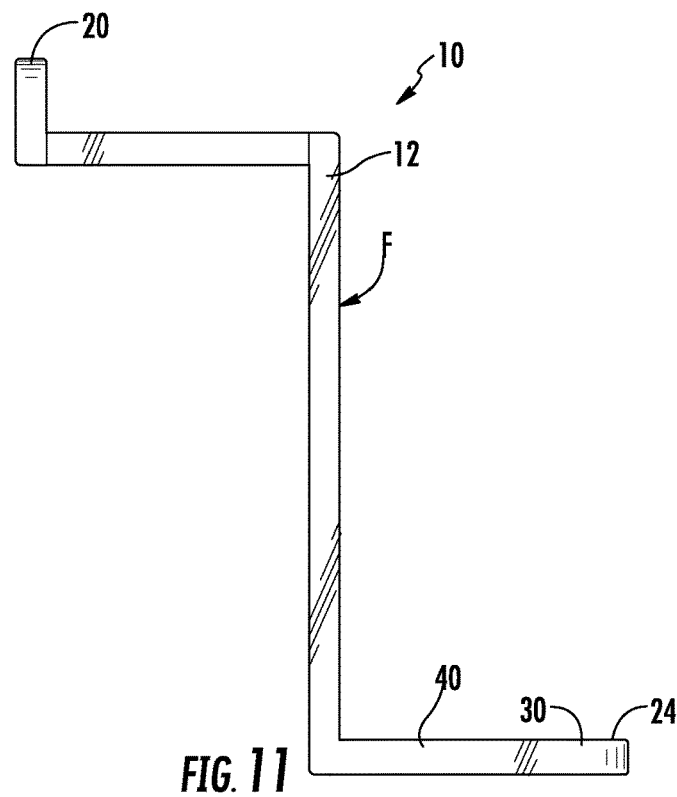
FIG. 11 is a side view of the accessory mount in a first configuration.
Figure 12:
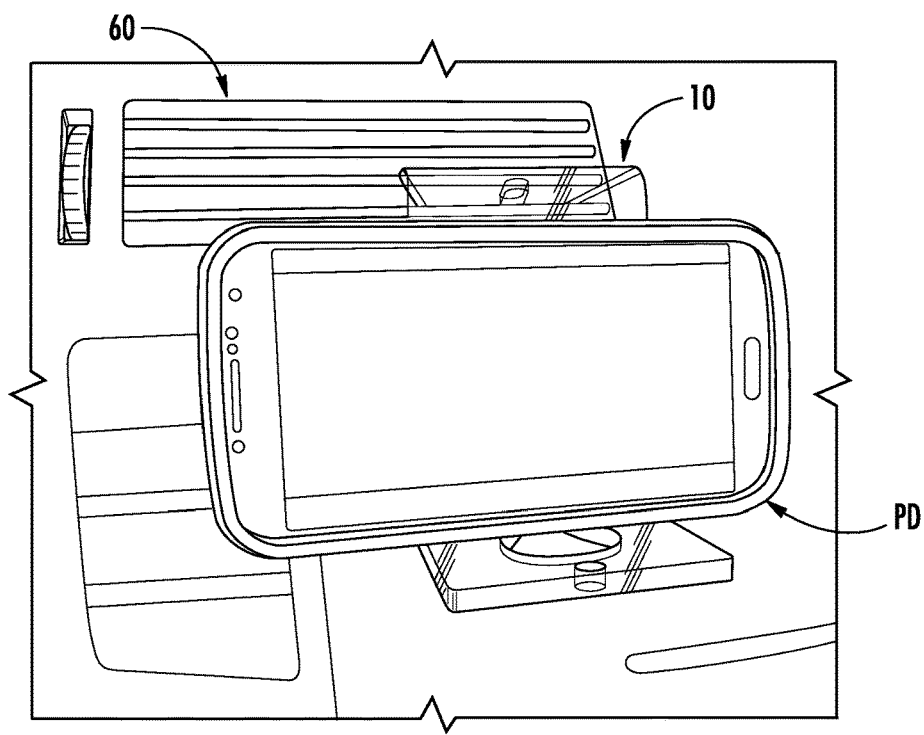
FIG. 12 is an illustration of the accessory mount in the first configuration, installed in a vehicle air vent.

FIG. 11 shows a first configuration which uses only the main body 12. The portable electronic device PD is attached to the front face F. The accessory mount 10 may be placed with the second flange 24 on a flat surface (e.g. table, desk—not shown) at a vertical position, or laid back with the front face F inclined at approximately 30 degrees from the flat surface. In this configuration the first flange 20 may be mounted in an opening such as a vehicle air vent 60 (shown in FIG. 12) or a vehicle sunroof. In the illustrated example, the first leg 16 tapers in width from its proximate end to its distal end 22. This feature facilitates inserting the first leg 16 into some types of air vents. The accessory mount 10 could also be connected to a conventional tripod (not shown), for example using the threaded pin of a standard tripod (e.g. ¼"-20 UNC) or using a screw through the second hole 30 in the second flange 24.

Figure 22:
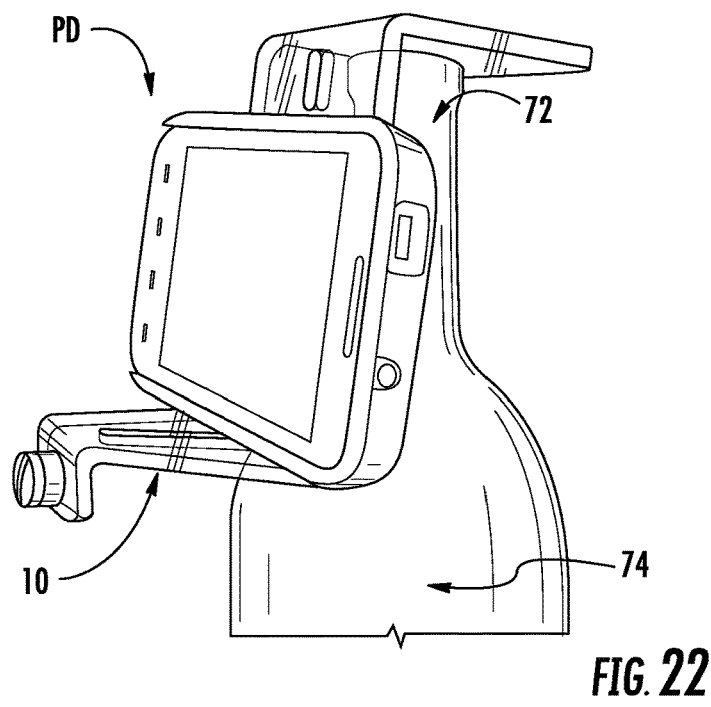
FIG. 22 is an illustration of the accessory mount in the first configuration, inverted and installed over the neck of a beverage bottle.

The main body 12 may also be used in an inverted configuration, with the first flange 20 oriented downwards. The portable electronic device PD is attached to the side opposite the front face F. In this configuration the third hole 40 may be used to hang main body 12 over the neck 72 of a wine bottle or other similar beverage container 74, as seen in FIG. 22. The diameter of the third hole may be made larger or smaller, for example to fit different size containers or to fit at different positions of a container with a long neck.

Figure 13:
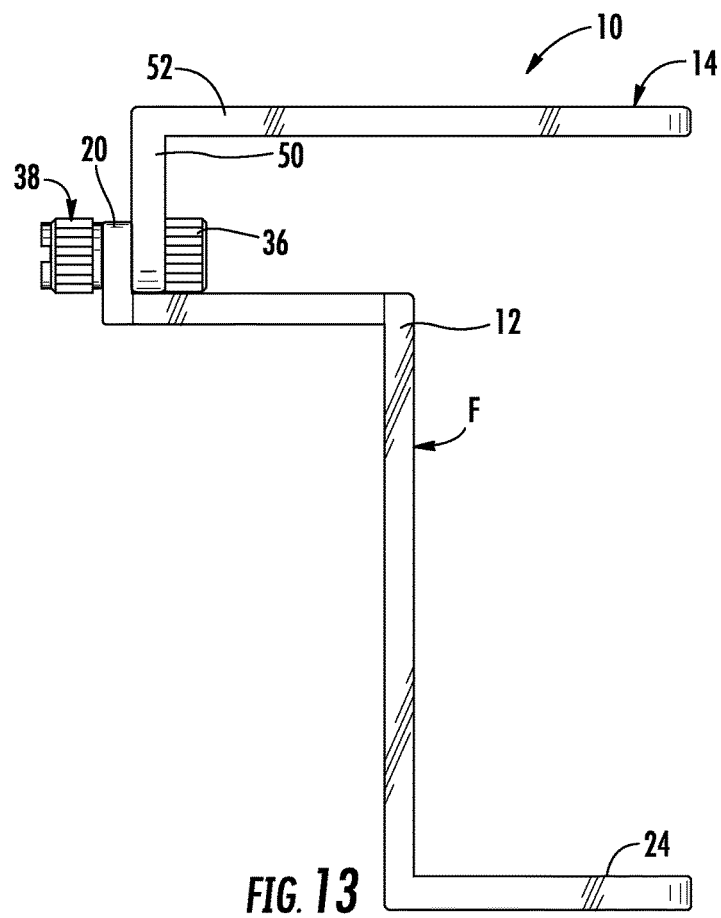
FIG. 13 is a side view of the accessory mount in a second configuration.
Figure 14:
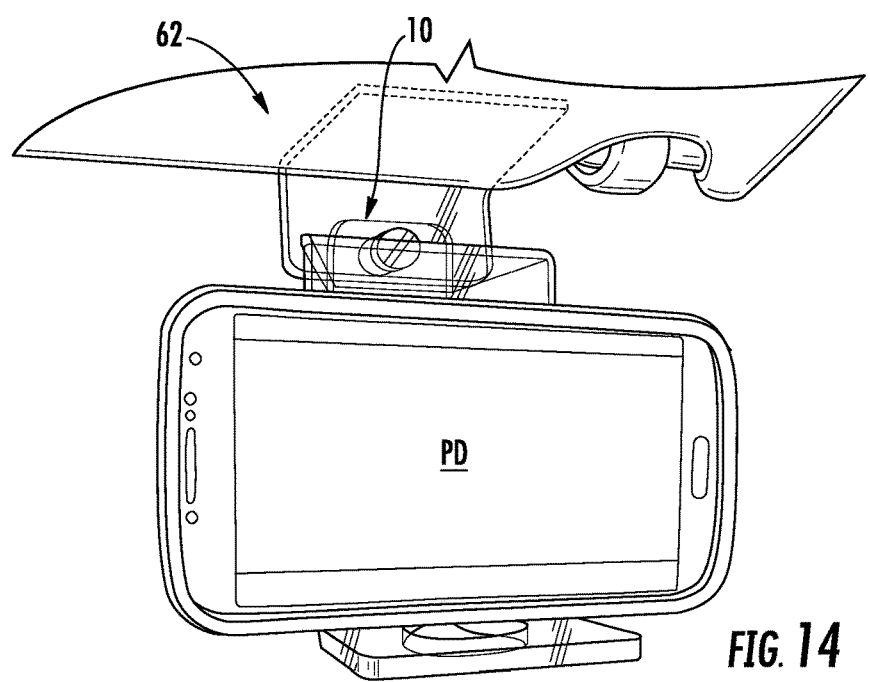
FIG. 14 is an illustration of the accessory mount in the second configuration, installed over a vehicle sun visor.

FIG. 13 shows a second configuration which uses the main body 12 and the extension 14, with the first extension leg 50 of the extension 14 connected to the first flange 20 of the main body 12, for example using the screw 36 and thumb nut 38 through the first hole 28 and the first extension slot 54. The second extension leg 52 of the extension 14 extends in the same direction as the second flange 24 of the main body 12. The portable electronic device PD is attached to the front face F. The accessory mount 10 may be placed with the second extension leg 52 hanging on a structure such as a sun visor 62 (shown in FIG. 14).

It is noted that the connection between the main body 12 and the extension 14 may be made by any means which is both secure and readily separable, in lieu of using the holes, slots, screw, and thumb nut described herein. Non-limiting examples of other types of connections include other kinds of mechanical fasteners, mating tabs or slots on the two components, hook-and-loop fasteners, dowels or pins, and magnets.

Figure 15:
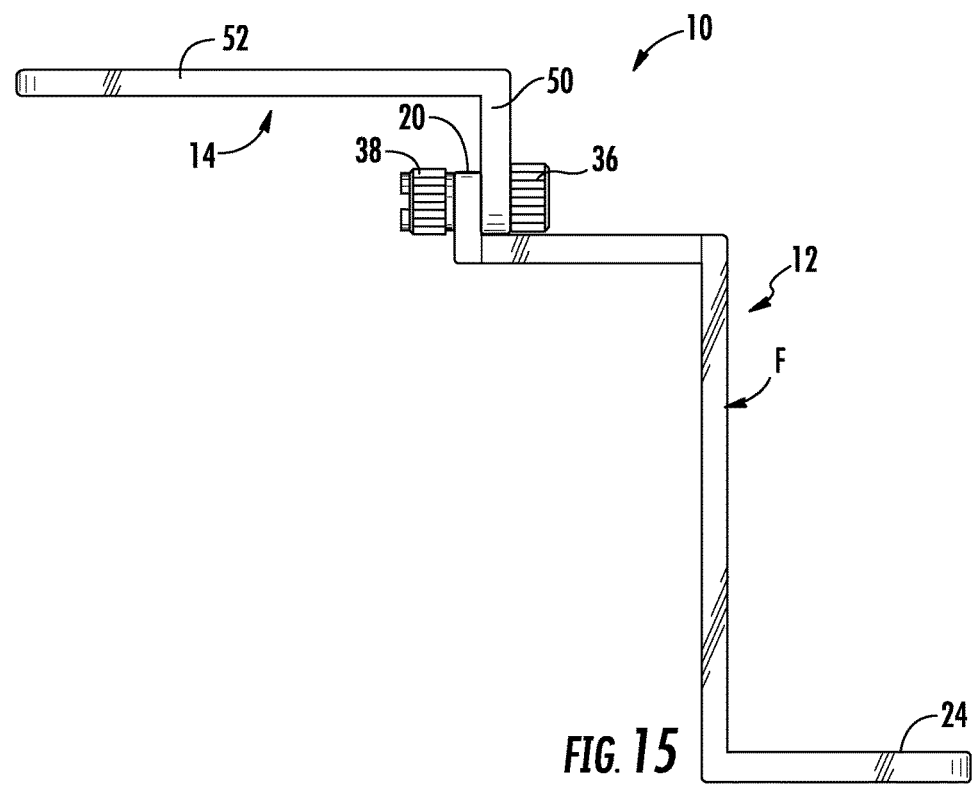
FIG. 15 is a side view of the accessory mount in a third configuration.
Figure 16:
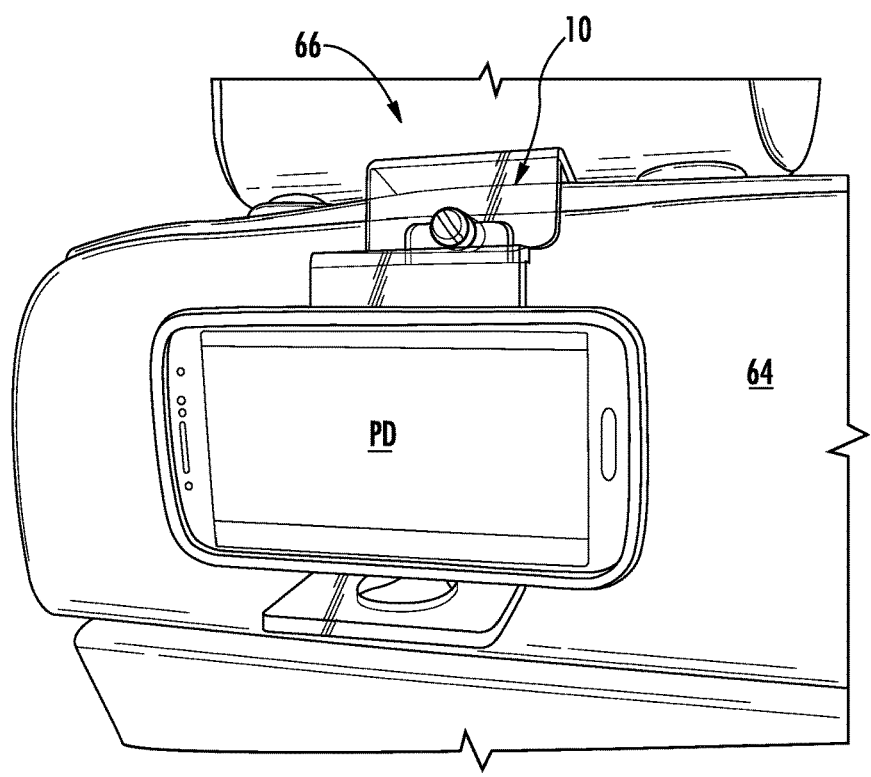
FIG. 16 is an illustration of the accessory mount in the third configuration, installed over a vehicle seat back.

FIG. 15 shows a third configuration which uses the main body 12 and the extension 14, with the first extension leg 50 of the extension 14 connected to the first flange 20 of the main body 12, for example using the screw 36 and thumb nut 38 through the first hole 28 and the first extension slot 54. The second extension leg 52 of the extension 14 extends in the opposite direction to the second flange 24 of the main body 12. The portable electronic device PD is attached to the front face F. The accessory mount 10 may be placed with the second extension leg 52 hanging on a structure such as a sun visor, or between the seat back 64 and head rest 66 of a vehicle, as shown in FIG. 16. The accessory mount 10 could also be placed on a flat surface (e.g. table, desk) with the front face F inclined at approximately 45 degrees from the surface.

Figure 4:
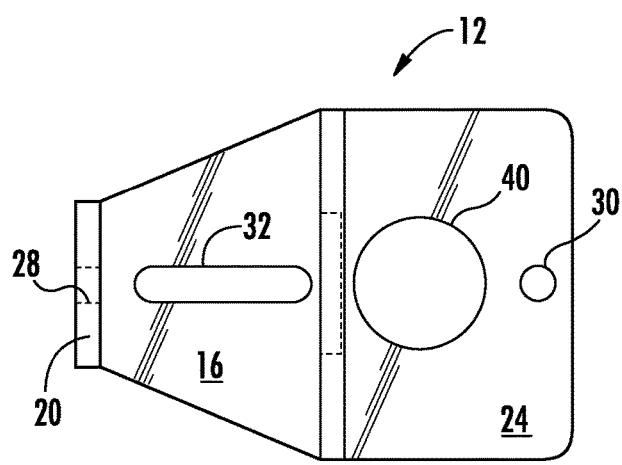
FIG. 4 is a top plan view of the main body of FIG. 2.
Figure 10:
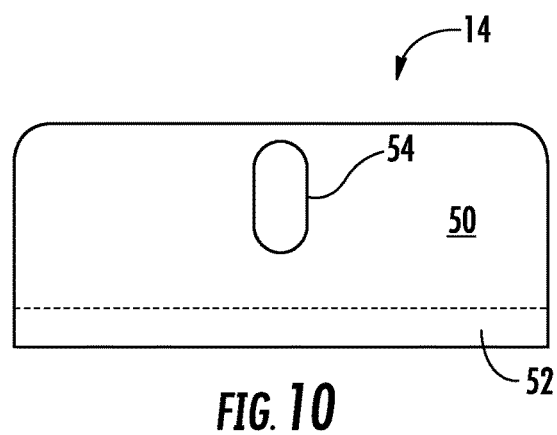
FIG. 10 is a top plan view of the extension of FIG. 8.
Figure 17:
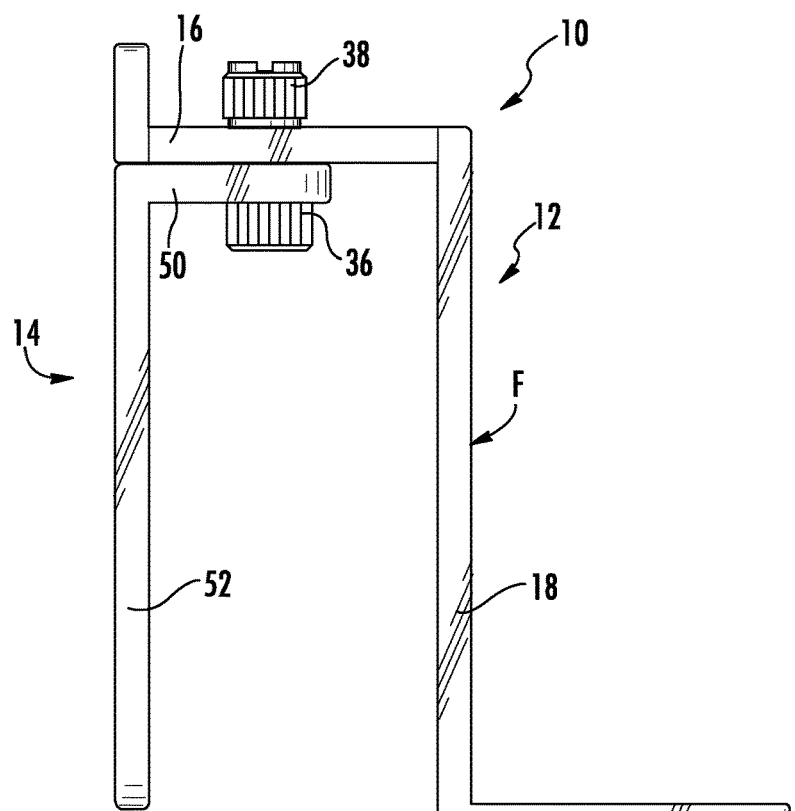
FIG. 17 is a side view of the accessory mount in a fourth configuration.
Figure 18:
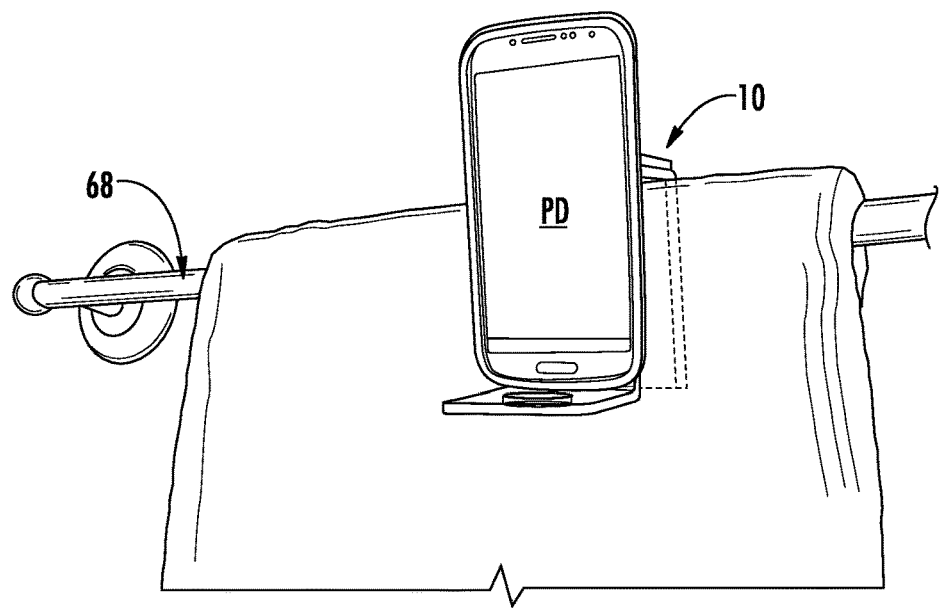
FIG. 18 is an illustration of the accessory mount in the fourth configuration, installed over a towel rack.

FIG. 17 shows a fourth configuration which uses the main body 12 and the extension 14, with the first extension leg 50 of the extension 14 connected to the first leg 16 of the main body 12, for example using the screw 36 and thumb nut 38 through the first slot 32 and the first extension slot 54 (the first slot 32 and the first extension slot 54 are seen in FIGS. 4 and 10, respectively). The second extension leg 52 of the extension 14 extends parallel to the second leg 18 of the main body 12. The portable electronic device PD is attached to the front face F. The accessory mount 10 may be placed on a flat surface at a vertical position, and provides extra stability in this position. It could also be hooked over a structure such as a vehicle grab rail or a towel rack 68, as shown in FIG. 18.

Figure 19:
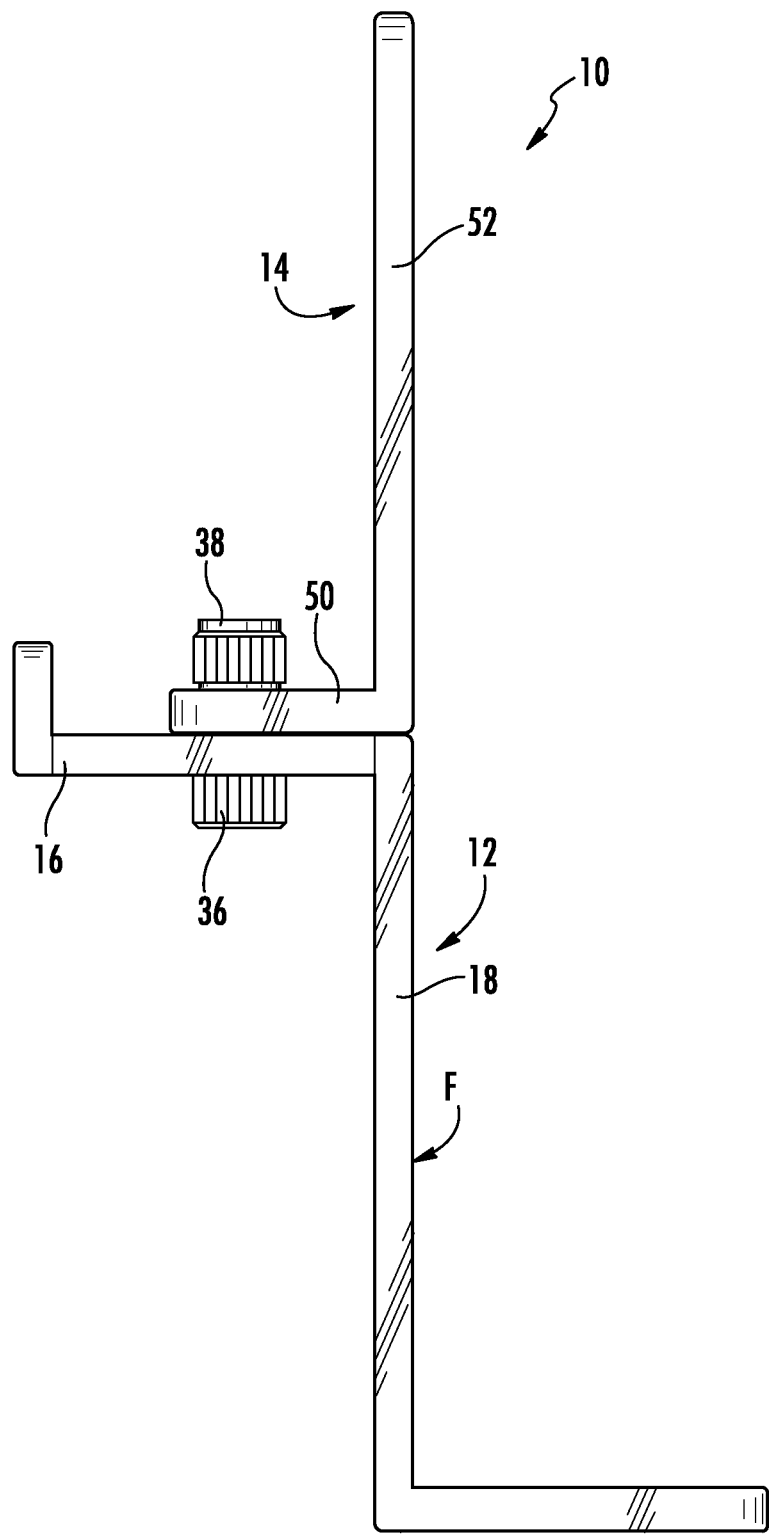
FIG. 19 is a side view of the accessory mount in a fifth configuration.

FIG. 19 shows a fifth configuration which uses the main body 12 and the extension 14, with the first extension leg 50 of the extension 14 connected to the first leg 16 of the main body 12, for example using the screw 36 and thumb nut 38 through the first slot 32 and the first extension slot 54 (the first slot 32 and the first extension slot 54 are seen in FIGS. 4 and 10, respectively). The second extension leg 52 of the extension 14 extends parallel to the second leg 18 of the main body 12, forming a continuous plane with the front face F. The portable electronic device PD is attached to the front face F. In this configuration, extra surface area is provided to support a larger portable electronic device such as a tablet computer. The accessory mount 10 may be placed on a flat surface laid back with the front face F inclined at approximately 30 degrees from the flat surface. It could also be attached to a tripod or to a vehicle air vent as described for the first configuration above.

Figure 20:
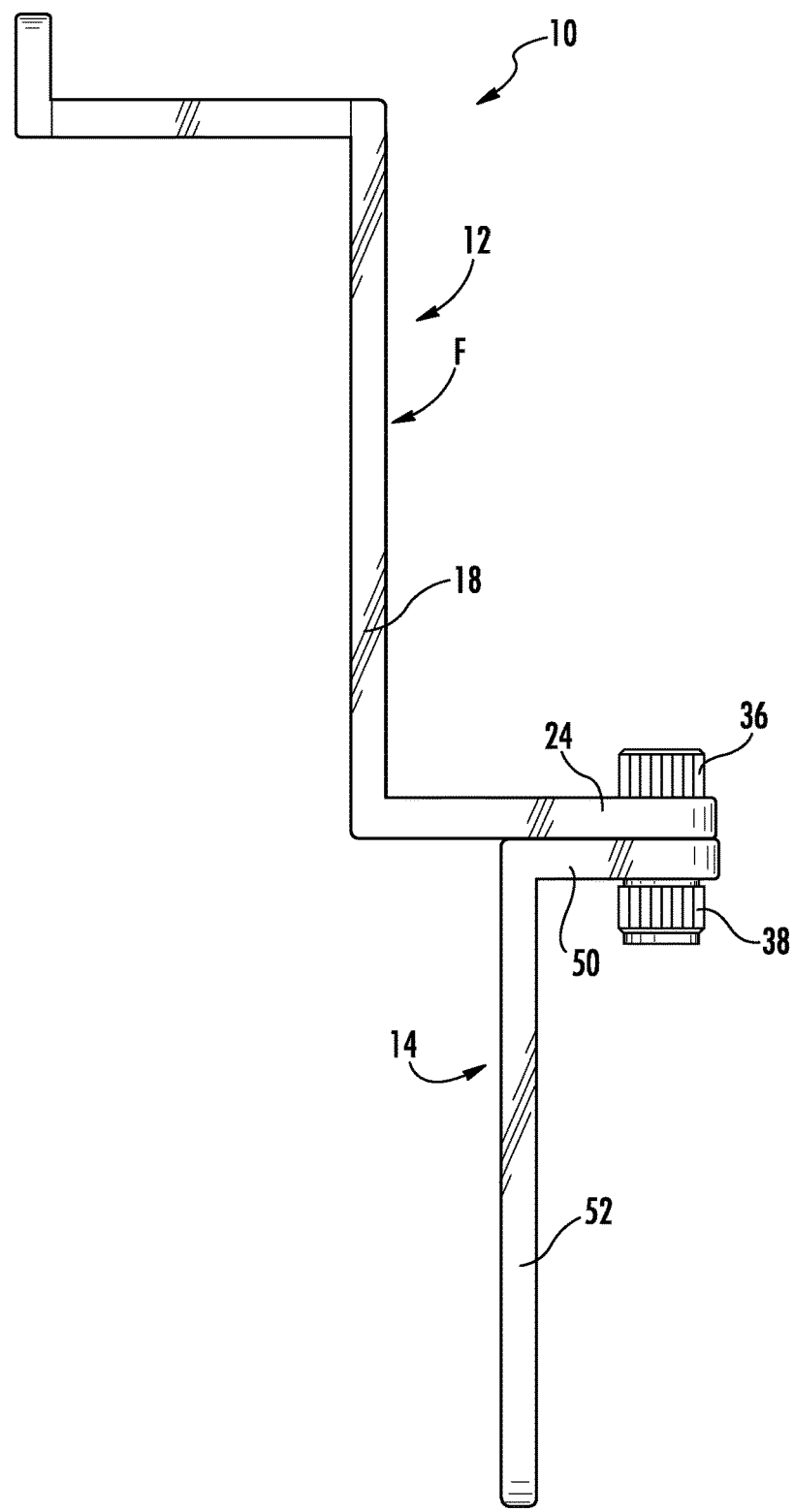
FIG. 20 is a side view of the accessory mount in a sixth configuration.
Figure 21:
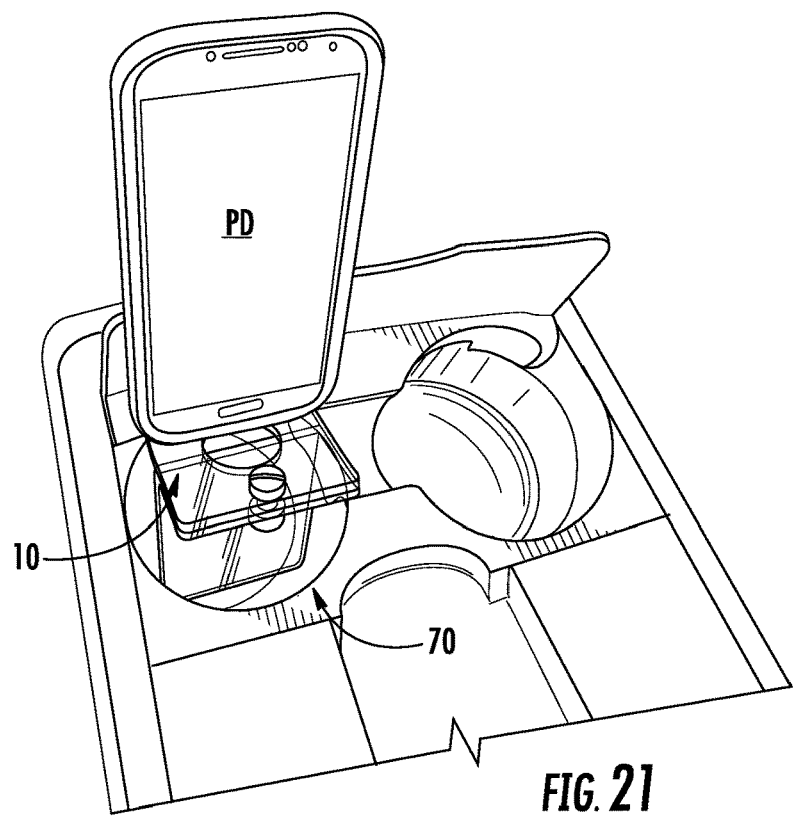
FIG. 21 is an illustration of the accessory mount in the sixth configuration, installed in a vehicle cup holder.

FIG. 20 shows a sixth configuration which uses the main body 12 and the extension 14, with the first extension leg 50 of the extension 14 connected to the second flange 24 of the main body 12, for example using the screw 36 and thumb nut 38 through the second hole 30 and the first extension slot 54 (the first slot 32 and the first extension slot 54 are seen in FIGS. 4 and 10, respectively). The second extension leg 52 of the extension 14 extends parallel with and opposite from the second leg 18 of the main body 12. The portable electronic device PD is attached to the front face F. In this configuration, the extension 14 can be positioned in a recess such as a vehicle cup holder 70, as shown in FIG. 21.

Figure 23:
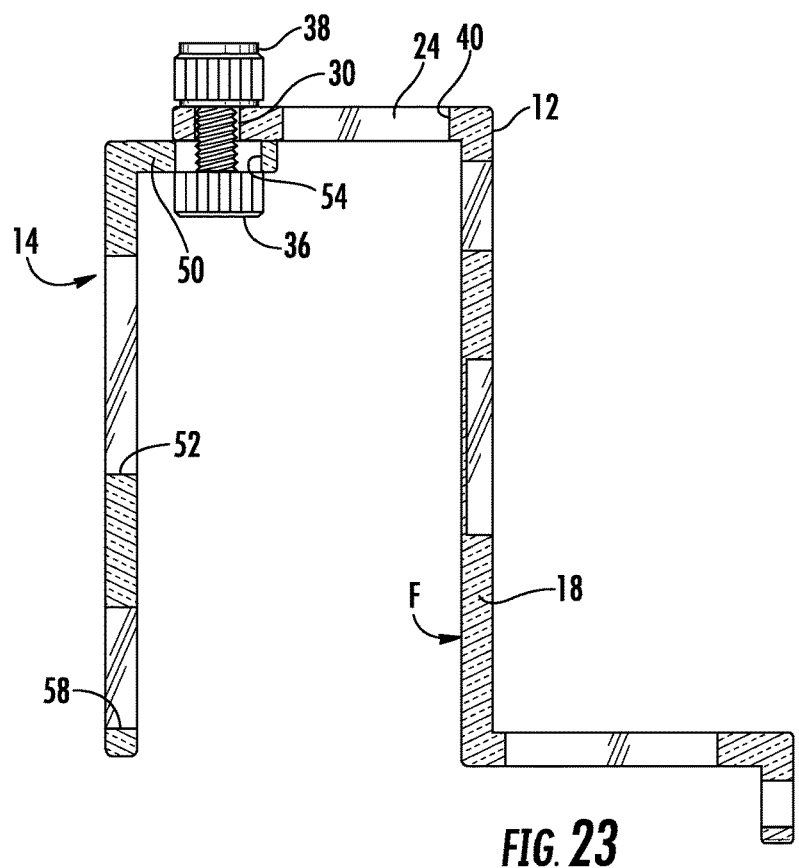
FIG. 23 is a cross-sectional view of the accessory mount in a seventh configuration.
Figure 24:
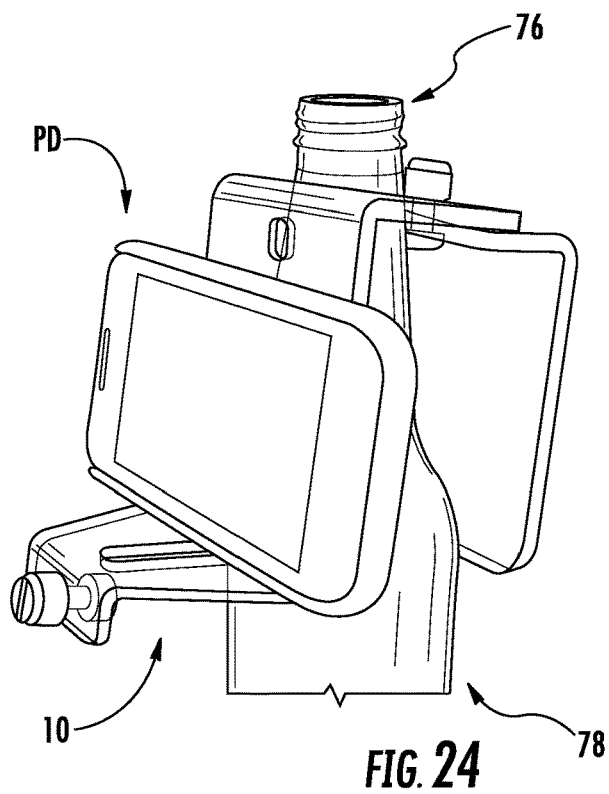
FIG. 24 is an illustration of the accessory mount in the seventh configuration, installed over the neck of a beverage bottle.

FIG. 23 shows a seventh configuration which uses the main body 12 and the extension 14, with the first extension leg 50 of the extension 14 connected to the second flange 24 of the main body 12, for example using the screw 36 and thumb nut 38 through the second hole 30 and the first extension slot 54. The second extension leg 52 of the extension 14 extends parallel to the second leg 18 of the main body 12. This configuration is similar to the fourth configuration described above, except that the main body 12 is inverted relative to the extension 14. The portable electronic device PD is attached to the side opposite the front face F. In this configuration the third hole 40 may be used to hang main body 12 over the neck 76 of a beer bottle or other similar beverage container 78, as seen in FIG. 24, and provides extra stability in this position.

Figure 25:
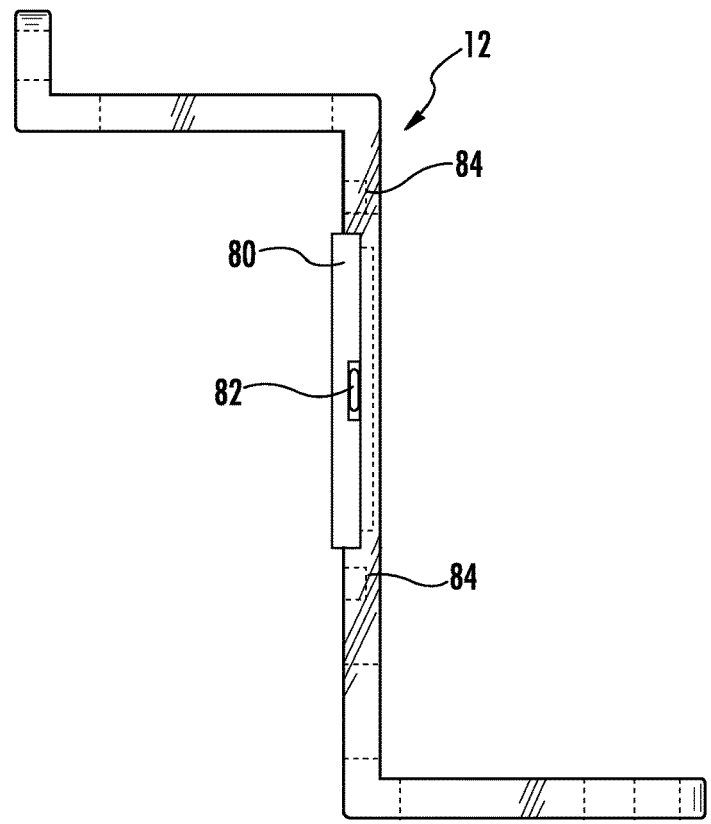
FIG. 25 is a side view of the accessory mount showing an optional charging coil.
Figure 26:
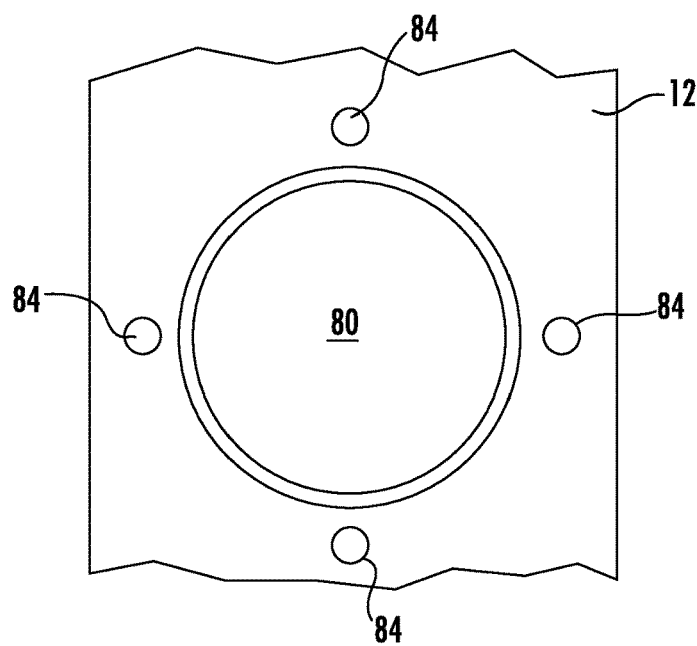
FIG. 26 is a front view of a portion of the accessory mount of FIG. 25 showing the optional charging coil.

Optionally, the mount 10 may incorporate provisions for charging a portable electronic device. For example, as shown in FIG. 25, an inductive charging coil 80 of a known type may be mounted to the main body 12. The coil 80 may be provided with a port 82 for connection to an electrical power source, for example a transformer powered by AC line current, a battery pack, or a vehicle power port (not shown). The charging coil 80 is effective to wirelessly transmit power to a portable electronic device having an inductive power pick-up coil (not shown). In place of the magnet 44 described above, one or more smaller magnets 84 may be arrayed around the periphery of the coil 80, as seen in FIGS. 25 and 26.

The foregoing has described an accessory mount for portable electronic devices. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstracts and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstracts and drawings), or to any novel one, or any novel combination, of the steps of any method or process so disclosed.

What is claimed is:

1. An accessory mount for a portable electronic device, comprising:
   a main body comprising a monolithic plate incorporating a plurality of rigid bends therein, the plurality of rigid bends defining:
     first and second legs which meet at mutual proximate ends thereof so as to form an L-shape, wherein the second leg defines a front face comprising means for connecting a portable electronic device thereto;
     a first flange disposed at a distal end of the first leg that extends away from the first leg in a direction opposite to the second leg; and
     a second flange disposed at a distal end of the second leg that extends away from the second leg in a direction opposite to the first leg;
   an extension comprising a monolithic plate incorporating at least one rigid bend therein, the at least one bend defining a first extension leg which meets a second extension leg to form an L-shape at mutual proximate ends thereof;
   wherein the main body includes a plurality of assembly openings passing therethrough, and the extension includes at least one assembly opening passing therethrough; and
   a mechanical fastener passing through aligned ones of the assembly openings of the main body and the extension, so as to connect the main body and the extension to each other, wherein the assembly openings of the main body and the extension are disposed such that the main body and the extension can be connected to each other in a plurality of different configurations, using the mechanical fastener passing through selected aligned ones of the assembly openings in the main body in the extension.

2. The accessory mount of claim 1 wherein the means for connecting include:

a recess formed in the second leg; and
a magnet disposed in the recess.

3. The accessory mount of claim 1 wherein a width of the first leg tapers to a smaller dimension from its proximate end to its distal end.

4. The accessory mount of claim 1 further comprising an inductive charging coil carried by the second leg.

5. The accessory mount of claim 1 wherein a hole having a diameter of approximately 1.125 inches is formed through the second flange.

6. The accessory mount of claim 4 further comprising an array of magnets disposed around the inductive charging coil.

7. The accessory mount of claim 1 wherein the main body comprises a polymer.

8. The accessory mount of claim 1 where the extension comprises a polymer.

\* \* \* \* \*